US010555253B2

(12) United States Patent
Chandramouli et al.

(10) Patent No.: US 10,555,253 B2
(45) Date of Patent: Feb. 4, 2020

(54) METHOD AND SYSTEM FOR SELECTION OF AN ACCESS AND MOBILITY MANAGEMENT FUNCTION IN AN ACCESS NETWORK ENVIRONMENT (71) Applicant: Nokia Technologies Oy, Espoo (FI)

(72) Inventors: Devaki Chandramouli, Plano, TX (US); Bruno Landais, Pleumeur-Bodou (FR); Laurent Thiebaut, Antony (FR); Peter Leis, Penzberg (DE); Miikka Juhana Poikselka, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/882,839

(22) Filed: Jan. 29, 2018

(65) Prior Publication Data
US 2018/0227842 A1 Aug. 9, 2018

Related U.S. Application Data (60) Provisional application No. 62/454,405, filed on Feb. 3, 2017.

(51) Int. Cl.
H04W 48/18 (2009.01)
H04W 76/27 (2018.01)
(Continued)

(52) U.S. Cl.
CPC .......... H04W 48/18 (2013.01); H04W 8/065 (2013.01); H04W 76/19 (2018.02); H04W 76/27 (2018.02);
(Continued)

(58) Field of Classification Search
CPC .............................. H04W 48/18; H04W 76/19
See application file for complete search history.

(56) References Cited

U.S. PATENT DOCUMENTS

2004/0052037 A1  3/2004 Sawyer
2010/0184432 A1  7/2010 Yano et al.
(Continued)

FOREIGN PATENT DOCUMENTS

WO  2011/062539 A1  5/2011
WO  2011/099769 A2  8/2011
WO  2015/002290 A1  1/2015

OTHER PUBLICATIONS

"3rd Generation Partnership Project; Technical Specification Group Services and System Aspects; Study on Architecture for Next Generation System (Release 14)", 3GPP TR 23.799, V14.0.0, Dec. 2016, pp. 1-522.
(Continued)

Primary Examiner — Angel T Brockman
(74) Attorney, Agent, or Firm — Squire Patton Boggs (US) LLP (57) ABSTRACT A method, apparatus and computer program product are provided in accordance with example embodiments in order to provide methods, apparatuses, and/or systems that reduce and/or eliminate network inefficiencies caused by the persistence of user-equipment-specific associations with network interfaces and elements, including but not limited to user-equipment-specific associations on at least N2. In some example implementations, an AMF may assign a temporary ID containing particularized identification information to a UE in a manner that allows for selection by a (R)AN of a AMF and that enables an AMF to process an N1/N2 transaction, such as may occur when a UE enters an idle mode and/or transitions from an idle mode to a connected mode.

19 Claims, 5 Drawing Sheets (51) Int. Cl.
  *H04W 8/06* (2009.01)
  *H04W 76/19* (2018.01)
  *H04L 29/06* (2006.01)
  *H04W 12/08* (2009.01)
  *H04W 48/04* (2009.01)
  *H04W 76/28* (2018.01)
  *H04W 12/06* (2009.01)
(52) U.S. Cl.
  CPC ............ *H04L 63/08* (2013.01); *H04L 63/108* (2013.01); *H04W 12/06* (2013.01); *H04W 12/08* (2013.01); *H04W 48/04* (2013.01); *H04W 76/28* (2018.02)

(56) References Cited

U.S. PATENT DOCUMENTS

2015/0327308 A1  11/2015  Lim et al.
2016/0119830 A1   4/2016  Iwai
2016/0165521 A1*  6/2016  Choi ..................... H04W 48/10
                                                    455/434
2016/0174120 A1   6/2016  Zembutsu et al.
2016/0295398 A1* 10/2016  Ketheesan .............. H04W 8/26
2017/0034743 A1*  2/2017  Draznin ............ H04W 36/0022
2017/0105233 A1*  4/2017  Zhang ................... H04W 16/14

OTHER PUBLICATIONS

"3rd Generation Partnership Project; Technical Specification Group Services and System Aspects;System Architecture for the 5G System; Stage 2 (Release 15)", 3GPP TS 23.501, V1.3.0, Sep. 2017, pp. 1-174.

International Search Report and Written Opinion corresponding to International Appln. No. PCT/IB2018/050530, dated Jun. 14, 2018.

* cited by examiner

METHOD AND SYSTEM FOR SELECTION OF AN ACCESS AND MOBILITY MANAGEMENT FUNCTION IN AN ACCESS NETWORK ENVIRONMENT

TECHNICAL FIELD

An example embodiment relates generally to wireless network access and communications technology, particularly in the context of addressing network inefficiencies caused by the persistence of user-equipment-specific associations with network interfaces and elements.

BACKGROUND

The ability to engage in communication and high-quality data transfer over wireless networks has become an important aspect of modern life upon which individuals rely. In addition to the traditional mobile telephonic and text-based communication that have been widely adopted by users, network operators and the networks they control are facing increased demands to provide support for enhancements to existing technologies and emerging technologies. While networks and their operators are typically able to meet user expectation and demands, the ever-increasing demands for network connectivity, bandwidth, and speed can place strains on finite network resources.

As a result, network operators constantly seek to reduce or eliminate sources of potential network inefficiencies that divert network resources and otherwise contribute to undesirable network performance Eliminating the potential issues caused by the persistence of user-equipment-specific associations within a network environment raises a number of technical challenges. The inventors of the invention disclosed herein have identified these and other technical challenges, and developed the solutions described and otherwise referenced herein.

BRIEF SUMMARY

A method, apparatus and computer program product are therefore provided in accordance with an example embodiment in order to provide methods, apparatuses, and/or systems that reduce and/or eliminate network inefficiencies caused by the persistence of user-equipment-specific associations with network interfaces and elements, including but not limited to user-equipment-specific associations on at least N2. It will be appreciated that the term "N2" as used herein represents any control plane interface between any access network (AN) (including but not limited to a radio access network (RAN) and/or another access network, for example) and a core network hosting a function (such as an Access and Mobility Management Function (AMF), for example) that includes the functionality to interface with the AN in order to serve User Equipment (UE) connected to said AN and to provide access control and mobility management for such UE. It will also be appreciated that the term (R)AN, as used herein, refers to any access network, including but not limited to a RAN and/or another access network which which may or may not include a RAN as a portion of the AN. In some example implementations, an AMF may assign a temporary ID containing particularized identification information to a UE in a manner that allows for selection by an (R)AN of an AMF and that enables an AMF to process an N1/N2 transaction, such as may occur when a UE enters an idle mode and/or transitions from an idle mode to a connected mode.

Many example implementations of the invention described and/or otherwise disclosed herein are able to provide for and/or facilitate solutions that exhibit the following characteristics and/or otherwise exhibit the following principles:

(1) In at least some example implementations, a temporary ID should include information sufficient to identify the UE, locate the registered UE context, identify the pool of AMFs and/or optionally identify a specific AMF instance. In addition, a temporary ID could identify a data center to help a (R)AN select an AMF within a certain DC and/or identify a vendor ID to help select an AMF from a certain vendor.

(2) In situations where a relevant AMF wants to become "non-sticky", that AMF may send a hybrid release to the (R)AN to indicate that N2 is released but N3 (which may be a user plane interface, for example) is still active for the given UE.

(3) Situations involving a specified approach to N2 stickiness removal in 3GPP should allow an AMF to determine whether it remains sticky or not, as an implementation-specific option. As such, it should allow one or more stateless and/or stateful AMFs to be deployed in an operator's network.

(4)(a) In many example implementations, an AMF may send a "hybrid release" indication to other CP NFs to indicate that the AMF is not serving a given UE anymore. In other situations, if the AMF desires to cease serving any UE that transitions from IDLE to CONNECTED, the AMF may send a "per AMF" hybrid release indication to other CP NFs with which the AMF interfaces. In some such situations, when the AMF starts serving the UE, it may also send a "per AMF" setup indication to the same set up of CP NFs. In some example implementations, it may also be assumed that other CP NFs interfacing AMFs contain AMF ID information which may include at least an AMF Group ID and/or an AMF instance ID. Consequently, when the CP NFs receive the hybrid release indication, they may remove the AMF instance ID from the corresponding UE context information. As such, for a subsequent MT transaction, it will use just the AMF Group ID for selection.

(4)(b) In some situations, a central repository may be needed for validation of a selected AMF by a (R)AN and/or other Core CP NFs.

(4)(c) In some situations, support for an AMF redirection solution is necessary to resolve race conditions.

(5) In some situations, an AMF stickiness removal requirement is agnostic to the UE. This implies that the old serving AMF (that is, the AMF serving one or more previous UE specific transactions) and the new serving AMF (that is, the AMF serving a new UE specific transaction) support similar capabilities and services.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

Many of the drawings refer to a radio access network or RAN for the purposes of clarity and to provide the particulars of one or more example implementations that may be possible within the scope of the invention described and/or otherwise disclosed herein. It should be appreciated, however, that such examples are not intended to limit the scope of the invention to only implementations that may involve a RAN, as the invention applies to and may be implemented in accordance with any kind of access network and/or combination of access networks.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with example embodiments in order to reduce and/or eliminate network inefficiencies caused by the persistence of user-equipment-specific associations with network interfaces and elements, including but not limited to user-equipment-specific associations on at least N2. Many implementations of example embodiments of the invention disclosed and otherwise contemplated herein are directed to enabling an Access and Mobility Management Function (AMF) within an access network (which, as noted above, may be referred to herein as a (R)AN) environment to process a subsequent N1/N2 transaction, including but not limited to such transactions involving one or more UEs that may be entering an idle mode and/or transitioning from and idle mode to a connected mode. Such example implementations may support the reduction or elimination of issues caused by the persistence (which may be referred to as "stickiness") of UE-specific associations, including but not limited to such associations on at least N2.

As development of fifth-generation (5G) and other advanced networks has progressed, many participants in the networking industry and other relevant fields have recognized a number of characteristics and situations that may be provided for and encountered by such networks. For example, it is likely that many network environments that adhere to 5G standards and protocols will allow for broadband connectivity that is capable of delivering, on demand, uplink and downlink bandwidth on the order of one or more gigabytes per second. Such network environments may also support critical machine-type communication that may allow for the immediate (that is, with very low e2e latency, for example) synchronous eye-hand feedback that may, for example, enable remote control of robots and vehicles. Such networks may also support large volumes of machine-type communication that connects billions of sensors and machines, for example.

One of the potentially significant differences between the design requirements associated with 4G networks and those associated with 5G and/or similar networks, for example, is the diversity of use-cases that 5G networks may be required to support. This is particularly apparent when considering that many 4G networks were primarily designed for the single use-case of delivering high-speed mobile broadband connectivity. In contrast, some proposals contemplate that 5G networks will not be limited to being only a new radio access technology family, but that the 5G architecture may expand to multiple dimensions. In particular, some such proposals contemplate the use of a common core for multiple radio technologies (such as cellular, Wi-Fi, and/or fixed technologies, for example), multiple services (such as those associated with the Internet-of-Things (IoT), mobile broadband, and/or low latency-high reliability services, for example), and multiple network and service operators.

To enable 5G and 5G-type networks to meet these and other design goals, a number of technical challenges must be overcome and/or otherwise addressed. One such technical challenge that has been recognized by the inventors and by other industry participants is the removal of N2 stickiness (for example, agreement that at least N2 stickiness removal should be specified in rel-15 is reflected in TR 23.799). In particular, some approaches to the development of 5G networks contemplate that the architecture should support mechanisms to avoid issues caused by the persistence (or stickiness) of UE-specific associations on at least N2.

Some approaches to aspects of this technical challenge contemplate situations where a UE is in a connected mode. In such approaches, if the AMF continues to be a serving node when the UE is in a connected mode, the relevant (R)AN(radio) access network (AN) uses the AMF group ID and the AMF instance ID or N2AP-ID to select the correct AMF pool and the correct AMF instance. In such contexts, in the event that an AMF wants to become stateless, the AMF transmits to the (R)AN an indication of a "hybrid release" to indicate that N2 is released, but N3 is active. Based upon this hybrid release, the (R)AN becomes informed that the AMF is no longer a serving node. In such a case, the (R)AN uses the AMF group ID only to select the correct AMF pool. The (R)AN may then select any AMF for forwarding an N1/N2 message. In such situations, the selected AMF uses the DS ID within a temporary ID to retrieve the relevant UE context and process the transaction.

This approach itself raises and reveals additional technical challenges. Since this approach assumes that the (R)AN remembers the UE context in order to perform an AMF selection appropriately, challenges arise when a UE and/or other relevant network element is in an "idle mode", as the (R)AN will lose the UE context when the UE is in an idle mode. One of the technical challenges that the inventors of the invention disclosed and/or otherwise contemplated herein have recognized is that of determining how the (R)AN may know whether to use just the AMF Group ID or both the AMF Group ID and an instance ID for AMF selection when a UE sends an initial NAS message during the transition from an idle state to a connected state. One aspect of this technical challenge arises when it cannot be assumed that a (R)AN remembers a relevant hybrid release indication.

Implementations of example embodiments of the invention described, contemplated, and otherwise disclosed herein are directed to providing a solution to support the removal of N2 and/or other stickiness in a network environment. Many such example implementations are directed to enabling any AMF to process a subsequent N1/N2 transaction. Some such example implementations are particularly directed to enabling any AMF to process a subsequent N1/N2 transaction in situations where one or more UEs are entering an idle mode and/or transitioning from an idle mode to a connected mode.

It will be appreciated that, in many situations, the requirement to remove N2 stickiness from a network environment (including but not limited to a 5G or similar network environment) may involve allowing an AMF to decide that it does not want to be a serving AMF for a certain UE, including but not limited to situations and contexts when the UE is in a CM-CONNECTED mode (which may, in some situations, be referred to as RRC-Connected/RRC-ConnectedInactive, for example) and/or when the UE is in a CM-IDLE mode. In some situations, the trigger for this decision within an AMF is implementation-specific (for example, upon completion of an N1/N2 transaction and/or based on internal load balancing reasons, or otherwise). In some situations, when the AMF decides that it does not want to remain as a serving AMF anymore, it may release one or more UE specific connections and store UE contexts elsewhere (such as in an external database, for example) without any impact to the services provided for the UE and without any additional signaling towards the UE. Consequently, for a subsequent UE-specific transaction, it may become essential for the requester network functions (NFs) (such as the (R)AN and/or other NFs, for example) to have the ability to select an AMF for serving the given UE. Furthermore, it may, in some situations, be essential for the AMF to be able to retrieve the UE context in order to process one or more relevant messages.

It will be appreciated that, in some contexts, some AMF implementations may store (opaque) UE context in a separate database (which may, for example, permit the decoupling of computing from storage), while some other AMF implementations may store UE context within the AMF itself. In some example implementations arising in an evolved packet system (EPS), when a mobility management entity (MME) assigned a temporary ID for the relevant UE, the UE may have become associated to a certain serving MME. As a result, the globally unique temporary ID (GUTI) contained both MMEGI and MMEC. With respect to a 5G system and/or a similar system, in order to remove stickiness by disassociating an UE to a certain AMF, some example implementations contemplate generically associating the UE to the location where UE context is stored. It will be appreciated that this approach allows either AMF implementation option to work. Moreover, in some such cases, the target AMF can use the temporary ID to obtain a pointer to the location where the relevant UE context is stored.

In some example implementations, it may be considered essential for a new AMF to deterministically know where the precise location of the storage of the relevant UE context. In some such situations, if no information that permits the locating of the registered UE context is included, then a full authentication with the home network may need to be run each time the UE transitions out from an idle mode. It will be appreciated that the repeated performance of such a full authentication with the home network may be undesirable in many network environments, and, consequently, should be avoided in such contexts. Moreover, situations where the temp id associated with a UE cannot be resolved in the network may raise privacy implications, particularly to the extent that such situations require the UE to send a long-term identifier to another network element.

Consequently, many implementations of example embodiments of the invention described, contemplated, and/or otherwise disclosed herein address at least the following two aspects that are associated effectively allowing any AMF instance to process a subsequent N1/N2 transaction: (1) AMF selection for UE-specific MO/MT transactions, and (2) UE context storage and retrieval. It will be appreciated that some such example implementations arise in contexts where the following principles may be assumed: (1) for the duration of an individual NAS or N2 procedures, the relevant UE shall be served by the same AMF Instance; (2) time-separated NAS or N2 procedures from one UE are permitted to use different instances of the AMF; (3) it should be possible to release a "per UE association" from the AMF without additional signaling (such as for temporary ID reassignment, for example) towards an inactive UE; and (4) there may be only one serving AMF at any given point in time for a certain UE.

In order to facilitate and/or otherwise implement the removal of N2 stickiness and/or otherwise address issues related to persistence of UE-specific associations on N2 and/or other interfaces, many of the example implementations described and/or otherwise contemplated here involve the use, by an AMF or other relevant network element of a temporary ID that may be associated with a UE. Many such example implementations take into account the following considerations in their respective approaches to assigning a temporary ID:

(1) In some example implementations that arise in situations where support for a unified authentication framework would be beneficial, the temporary ID assigned by an AMF may implemented in a way so as to be common to 3GPP and non-3GPP access scenarios. For example, the same temporary ID can be used to access a single security context for a given UE.

(2) In some example implementations, the temporary ID may include information that permits the location of the registered UE context within the network. In some such example implementations, it may be advantageous to structure the temporary ID in a manner that accommodates the principle of splitting computation functions from storage functions. It should be appreciated that both stateful and stateless AMF implementations may be possible and actions associated with stateful and stateless AMF implementations may be supported and/or otherwise facilitated via the temporary ID.

(3) In some example implementations, it may be advantageous to avoid situations where no information sufficient to locate the registered UE context is included with the temporary ID, particularly if the inability to locate the relevant UE context would tend to trigger the running of a full authentication procedure with the home network at each time when the UE comes back from an idle mode or state.

(4) In some situations, an inability to resolve a temporary ID may have privacy implications, particularly in situations where such an inability would tend to necessitate the transmission by a UE of a long-term identifier.

In view of these and other considerations associated with the assignment of a temporary ID, some example implementations involve and otherwise contemplate the use of a temporary ID that may include at least some and/or all of the following information: (1) information that uniquely identifies a UE (which may include, for example, information on the entity that has allocated the temporary Id); (2) information that identifies the relevant pool of AMFs (such as an AMF Group ID, for example); (3) an identification of the relevant AMF instance (which may, for example be possibly associated with an indication that it is not valid for AMF selection); and (4) information that is sufficient to enable the location of the relevant registered UE context. It will be appreciated that the precise format of the temporary ID and/or the approach used to encode the information associated with the temporary ID may vary depending on the precise network environment, the protocols associated with that network environment, and/or other considerations. Consequently, any approach to structuring and/or encoding the temporary ID that includes the necessary information and otherwise conforms to the requirements of the particular network environment may be used. In some example implementations, it may be beneficial to ensure the unicity of a temporary ID within an area, particularly in view of considerations involving paging and/or the presence of unique DB in a group and where the temporary ID may not contain one or more portions of the relevant AMF information.

As discussed herein, many example implementations of embodiments of the present invention provide for the reduction and/or elimination network inefficiencies caused by the persistence of user-equipment-specific associations with network interfaces and elements through the novel use of a temporary ID at an AMF or other relevant network element. In particular, some example implementations of embodiments of the invention contemplate the use of a temporary ID and related novel protocols to enable any AMF to process a subsequent N1/N2 transaction, including but not limited to such transactions that may occur in situations where one or more UEs are entering an idle mode and/or transitioning from an idle mode to a connected mode.

Figure 1:
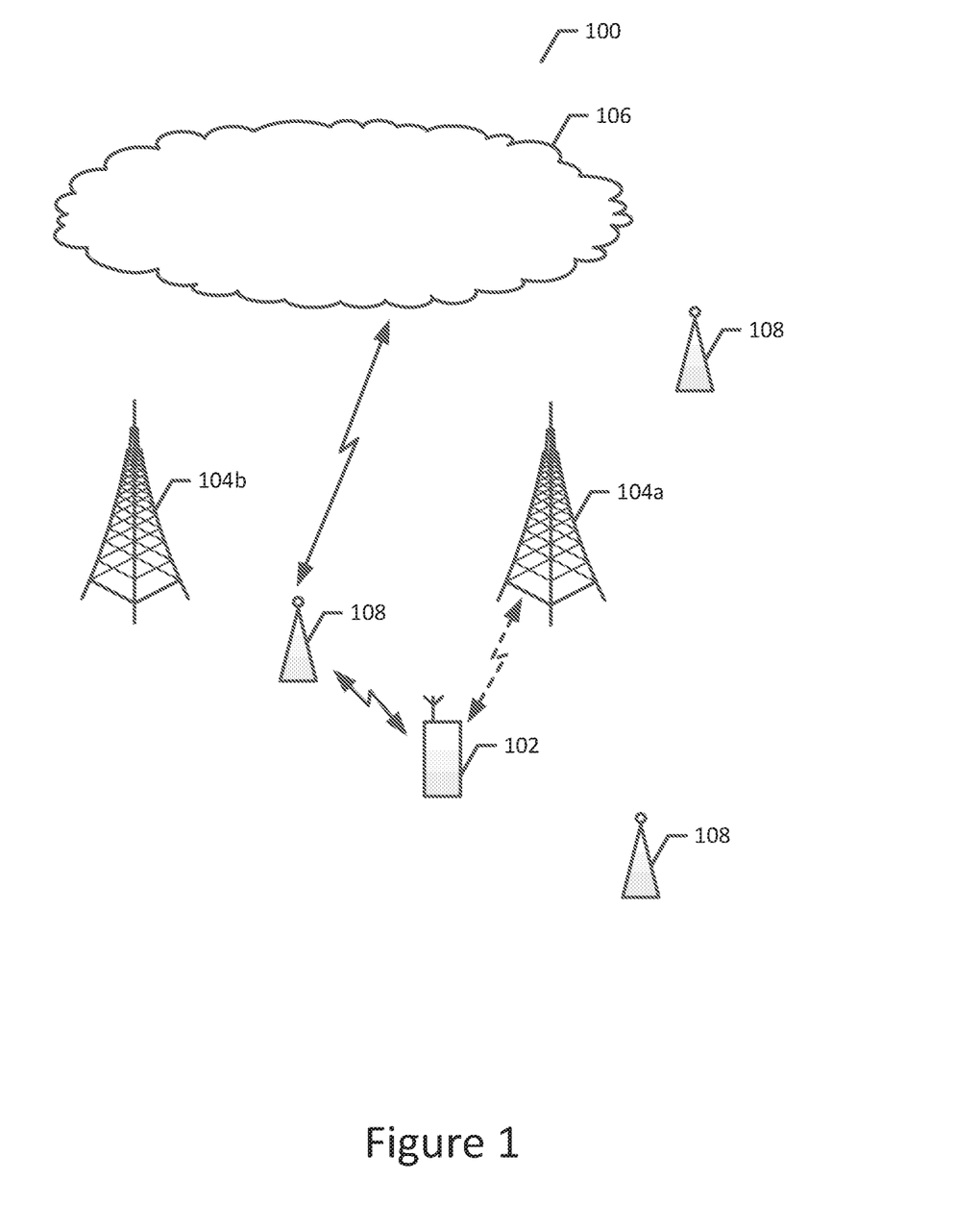
FIG. 1 depicts an example system environment in which implementations in accordance with an example embodiment of the present invention may be performed.

While the method, apparatus and computer program product of an example embodiment may be deployed in a variety of different systems, one example of a system that may benefit from the procedures discussed and contemplated herein in accordance with an example embodiment of the present invention is depicted in FIG. 1. The depiction of system environment 100 in FIG. 1 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1, and the system environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

As shown in FIG. 1, the system environment includes one or more user equipment 102 configured to communicate wirelessly, such as via an access network, with a network 106. Although the user equipment may be configured in a variety of different manners, the user equipment may be embodied as a mobile terminal, such as a portable digital assistant (PDA), mobile phone, smartphone, pager, mobile television, gaming device, laptop computer, camera, tablet computer, communicator, pad, headset, touch surface, video recorder, audio/video player, radio, electronic book, positioning device (e.g., global positioning system (GPS) device), or any combination of the aforementioned, and other types of voice and text and multi-modal communications systems. System environment 100, as depicted in FIG. 1, also includes one or more access points 104a and 104b, such as base stations, (such as node Bs, evolved Node Bs (eNB), or the like, for example). A cellular access point, such as a base station, may define and service one or more cells. The access points may, in turn, be in communication with a network 106, such as a core network via a gateway, such that the access points establish cellular radio access networks by which the user equipment 102 may communicate with the network. The system environment 100 of FIG. 1 may include a plurality of different cellular radio access networks including, for example, a 5G radio access network, an LTE radio access network, a UMTS (universal mobile telecommunications system) radio access network, etc. In some example implementations, equipment and other infrastructure associated with multiple different cellular radio access networks may be located at or near structures and/or other equipment associated with a particular access point, such as access point 104a and 104b.

In some implementations of system environment 100, the cellular radio access networks serviced by access points 104a, 104b, and any other access points in a given area are identical, in the sense that as user equipment 102 moves from an area serviced by access point 104a to an area serviced by access point 104b, the user equipment 102 is able to access the network 106 via a radio access network provided by the same vendor across access points. Although not shown, the system may also include a controller associated with one or more of the cellular access points, (such as base stations for example), so as to facilitate operation of the access points and management of the user equipment 102 in communication therewith. As shown in FIG. 1, a system may also include one or more wireless local area networks (WLANs), each of which may be serviced by a WLAN access point 108 configured to establish wireless communications with the user equipment. As such, the user equipment may communicate with the network via a WLAN access point as shown in solid lines in FIG. 1, or, alternatively, via a cellular access point as shown in dashed lines.

The radio access networks as well as the core networks may consist of additional network elements as routers, switches, servers, gateways, and/or controllers.

Figure 2:
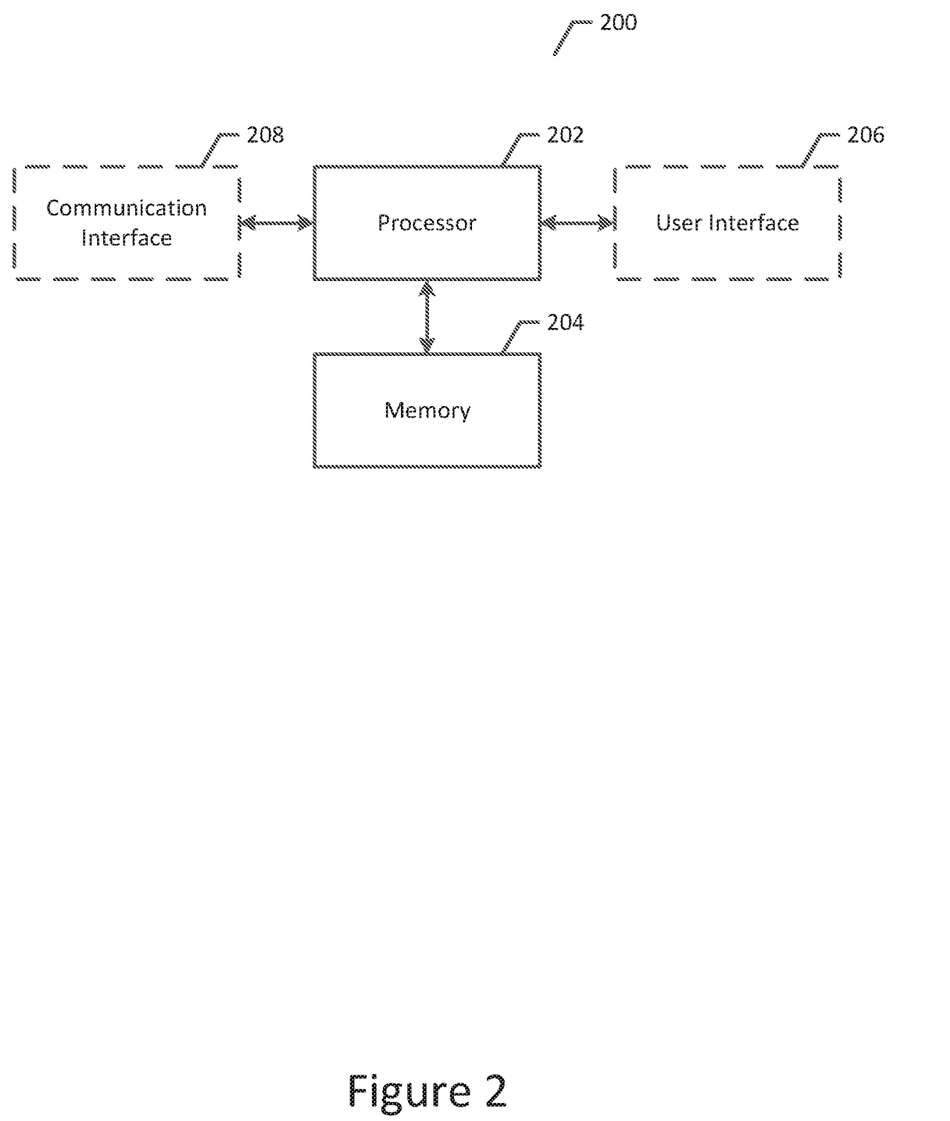
FIG. 2 is a block diagram of an apparatus that may be specifically configured in accordance with an example embodiment of the present invention.

In connection with the use of temporary ID and related protocols at an AMF, network performance issues that may be caused by the stickiness of UE-specific associations may be reduced and/or eliminated. In this regard, enabling an AMF to process a subsequent N1/N2 transaction and/or a similar transaction in a network environment can be accomplished by an apparatus 200 as depicted in FIG. 2. The apparatus may be embodied by and/or incorporated into one or more UEs, such as user equipment 102, or any of the other devices discussed with respect to FIG. 1, such as access points 104a and/or 104b, one or more of WLAN access points 108, and/or devices that may be incorporated or otherwise associated with system environment 100. Alternatively, the apparatus 200 may be embodied by another device, external to such devices. For example, the apparatus may be embodied by a computing device, such as a personal computer, a computer workstation, a server or the like, or by any of various mobile computing devices, such as a mobile terminal, (such as a smartphone, a tablet computer, or the like, for example). In some example implementations, it may be particularly advantageous to implement the apparatus 200 in connection with one or more RANs, AMFs and/or other network element and/or function.

Regardless of the manner in which the apparatus 200 is embodied, the apparatus of an example embodiment is configured to include or otherwise be in communication with a processor 202 and a memory device 204 and optionally the user interface 206 and/or a communication interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include a user interface 206 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 204, and/or the like).

The apparatus 200 may optionally also include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

As noted herein, many implementations of example embodiments of the invention described, contemplated, and/or otherwise disclosed herein are directed to allowing any AMF to process a subsequent N1/N2 transaction in a manner that removes and/or reduces the stickiness caused by UE-specific associations. As such, some example implementations are presented below to clarify how aspects of such example embodiments may be advantageous in certain situations.

Example Implementations Involving UEs in a CM-CONNECTED Mode:

Some example implementations arise in contexts where one or more relevant UEs are in a CM-CONNECTED mode and/or a similar mode, depending on the particulars of the network environment and/or the nomenclature used therein. In some such example implementations, at any point in time when a relevant AMF wants to and/or is otherwise designated to become "non-sticky" (such as after a certain N1/N2 transaction, for example), the AMF may send a notification and/or other indication of a "hybrid release" to the (R)AN. This "hybrid release" notification may serve to indicate to the (R)AN that N2 is released while N3 remains active for a given UE. Based on the hybrid release notification, the (R)AN may be considered to know and/or otherwise be informed that the previous AMF instance is no longer serving the given UE. Consequently, the (R)AN may, in some situations, delete the N2AP ID from the relevant UE context within the (R)AN. Moreover, the (R)AN may, for example, also remember and/or otherwise recognize that the AMF instance ID received within the temporary ID should not be used for subsequent transactions.

In example implementations that arise in such situations, for a subsequent N1/N2 transaction, the (R)AN may use the AMF group ID only to select the correct AMF pool. Upon selection of the correct AMF pool (based at least in part on the AMF Group ID, for example) the (R)AN may then select any AMF instance for forwarding the relevant N1/N2 message. In some such example implementations, the selected AMF may use the DS ID within the temporary ID to retrieve the relevant UE context and process the transaction.

In some such example implementations, when the UE is in a connected mode, the (R)AN may use the AMF group ID and/or a relevant N2AP-ID to address the correct AMF serving the UE, at least for so long as the AMF instance serving the UE has not sent hybrid release for an UE. As such, in example implementations where a UE is in a CM-CONNECTED mode and/or similar mode, an AMF may signal an intent to become "non-sticky" by sending a hybrid release notification to the (R)AN and thereby indicating that, for a particular UE, N2 is released while N3 remains active.

Figure 3:
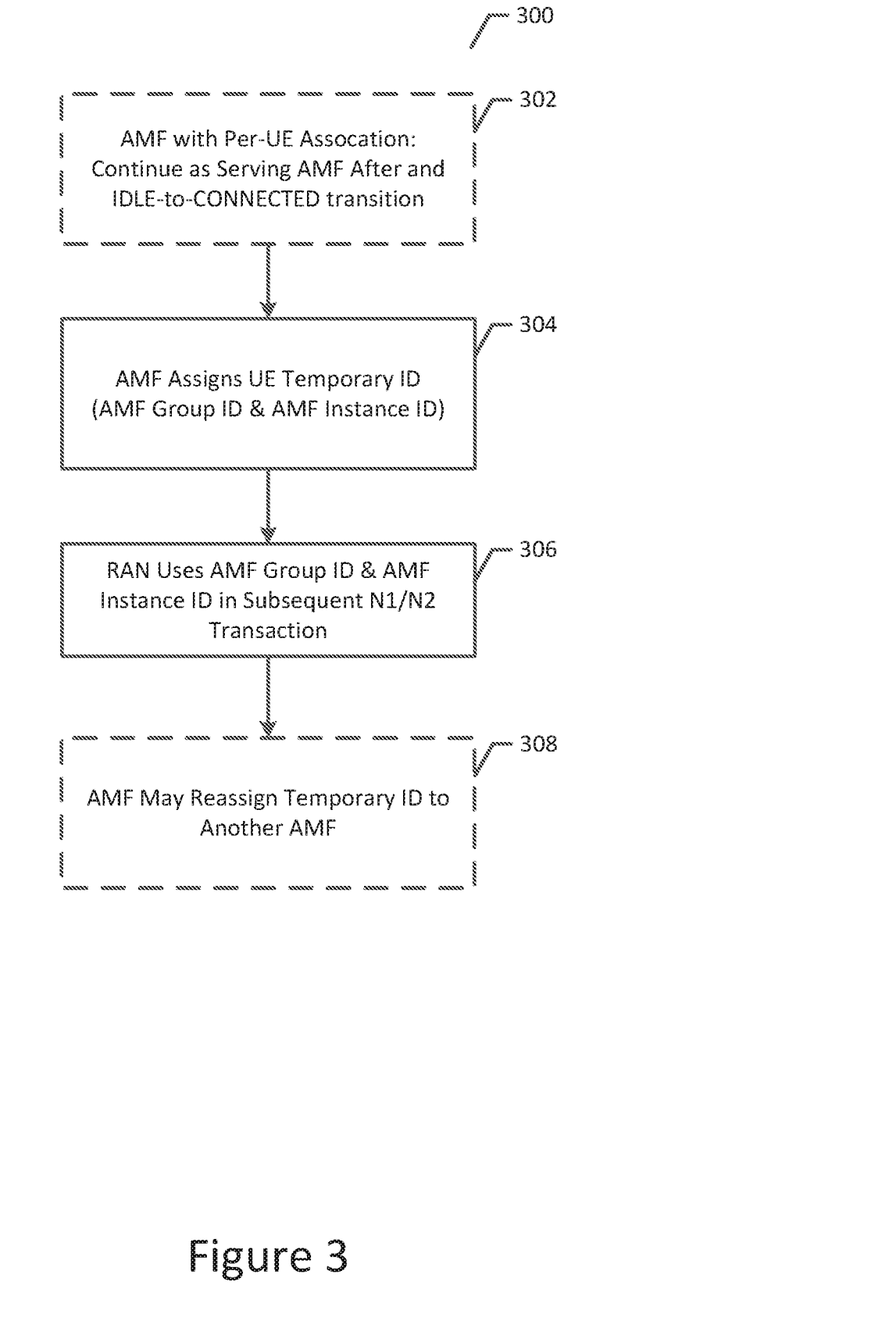
FIG. 3 is a flowchart illustrating a set of operations performed, such as by the apparatus of FIG. 2, in accordance with an example embodiment of the present invention.
Figure 4:
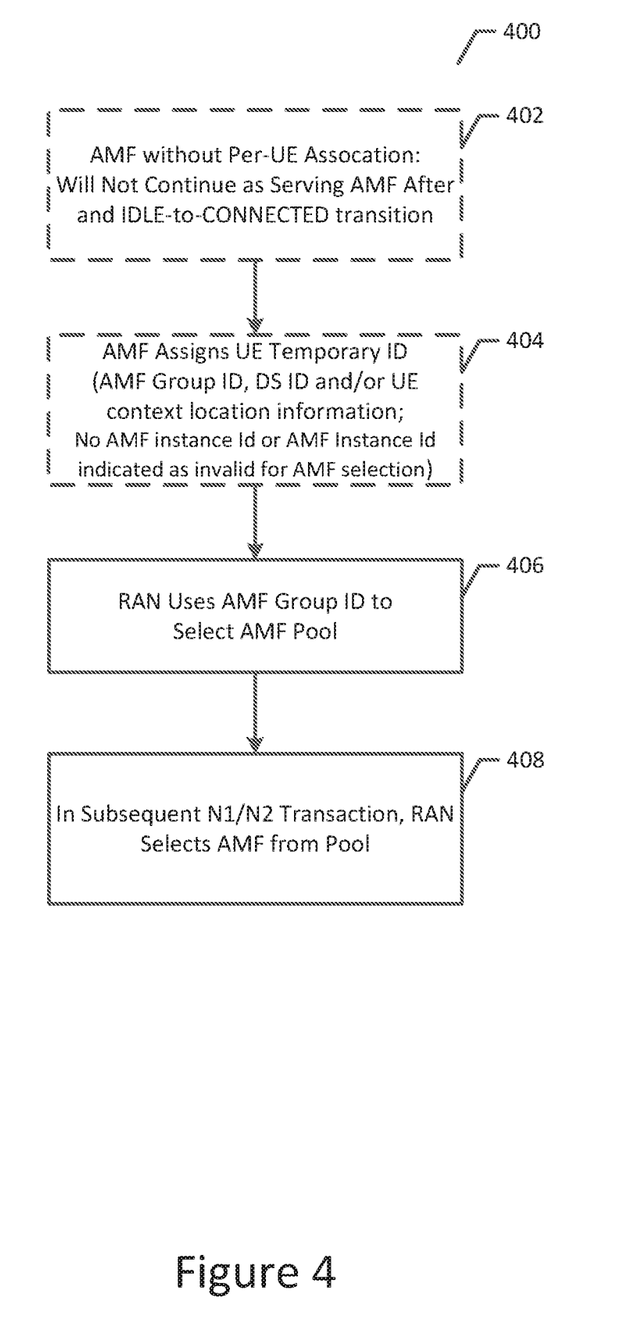
FIG. 4 is another a flowchart illustrating a set of operations performed, such as by the apparatus of FIG. 2, in accordance with an example embodiment of the present invention.
Figure 5:
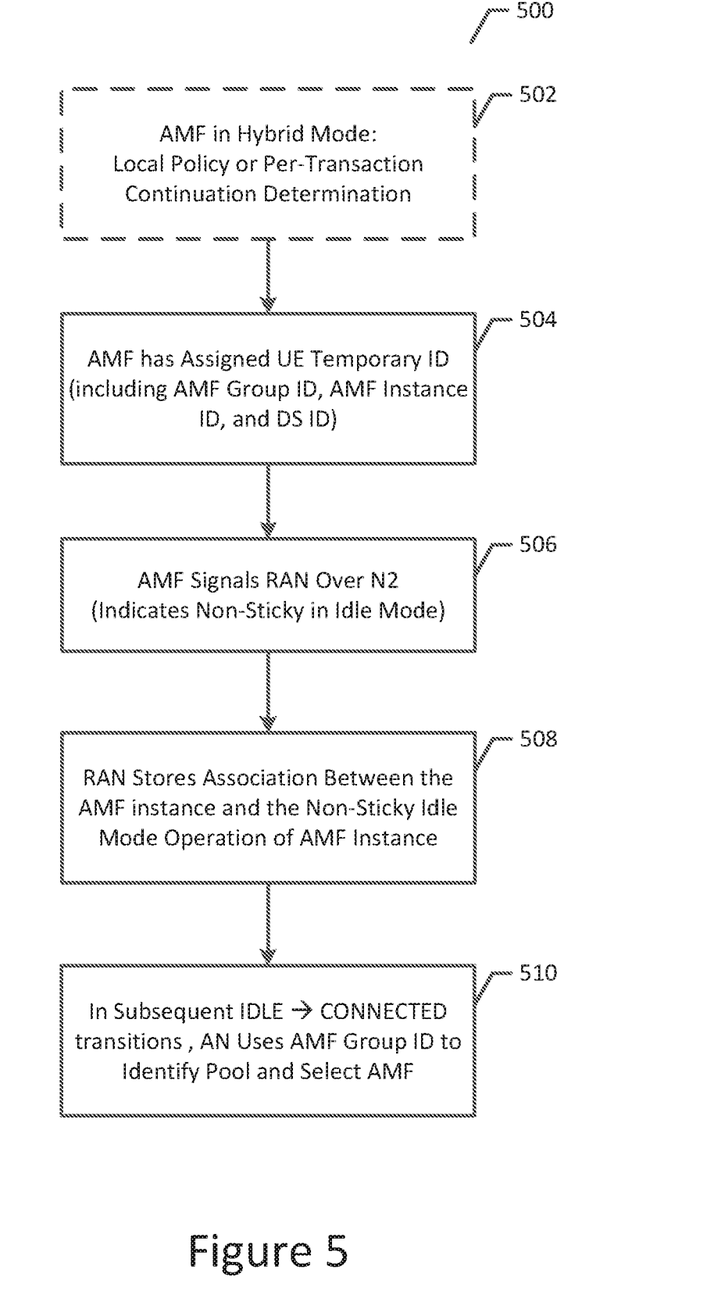
FIG. 5 is another flowchart illustrating a set of operations performed, such as by the apparatus of FIG. 2, in accordance with an example embodiment of the present invention.

Example Implementations Involving UEs Transitioning From a CM-IDLE Mode to a CM-CONNECTED Mode:

Some example implementations arise in contexts where one or more relevant UEs transition from a CM-IDLE mode to a CM-CONNECTED mode and/or similar modes, depending on the particulars of the network environment and/or the nomenclature used therein. Many such example implementations arise in one of three scenarios: situations where an AMF has per-UE association, situations where the AMF is without per-UE association, and situations where the AMF is in a hybrid mode. Example implementations directed to each of these scenarios are discussed herein and reflected in FIGS. 3, 4, and 5, respectively. It will be appreciated that each of FIGS. 3, 4, and 5 depict process flows that depict aspects of the operations that may be performed by the apparatus 200 and/or a similar apparatus. In this regard, it will be appreciated that the apparatus includes means, such as the processor 202, the memory 204, the user interface 206, the communication interface 208 or the like, for performing at least each of the steps reflected in the relevant process flows and/or otherwise described herein.

Example Scenario 1: AMF with Per-UE Association

As noted herein, some example implementations of embodiments of the invention described, contemplated, and/or otherwise disclosed herein involve a UE that is transitioning from a CM-IDLE mode to a CM-CONNECTED mode and an AMF that may be configured to have a per-UE association. FIG. 3 depicts an example process flow 300 that illustrates aspects of some such example implementations. As shown in block 302 of FIG. 3, process flow 300 arises in a situation involving an AMF with a per-UE association. In some such situations, an AMF may assume that it will likely continue to be the serving AMF for a relevant UE after most or all of a CM-IDLE to CM-CONNECTED transition is performed with respect to the UE. As shown in block 304 of FIG. 3, some example implementations of process flow 300 contemplate that, in such situations, the AMF may assign to the UE a temporary ID. In some such example implementations, the temporary ID includes an AMF group ID and an AMF instance ID. While some example implementations of process flow 300 in general, and block 304 in particular, may involve temporary IDs that include additional information, it will be appreciated that, in scenarios where the AMF has a per-UE association, the inclusion of only the AMF group ID and the AMF instance ID may be sufficient to enable to stickiness removal contemplated herein. For example, the temporary ID may or may not include a DS ID in the temporary ID. Moreover, in example implementations where a DS ID is included in the temporary ID, the DS ID may be equivalent to the AMF instance ID, depending on the particular environment in which the example implementation arises.

As shown at block 306, process flow 300 notes that, for subsequent N1/N2 transactions, such as those that may occur when the UE transitions from a CM-IDLE state to a CM-CONNECTED state, the (R)AN and/or other relevant access network may use the AMF Group ID and AMF instance ID to determine the AMF serving the UE.

As shown at block 308 of FIG. 3, some example implementations of process flow 300 contemplate that optionally, at a later time, the AMF may reassign the temporary ID to allow usage of another AMF of the same Group. For example, and with respect to a UE in a connected mode, the AMF may decide that it does not want to be the serving AMF. In such situations, the current AMF may amend the temporary ID to include a DS ID, and thus allow another AMF to retrieve the UE context for the relevant UE.

Example Scenario 2: AMF without Per-UE Association

As noted herein, some example implementations of embodiments of the invention described, contemplated, and/or otherwise disclosed herein involve a UE that is transitioning from a CM-IDLE mode to a CM-CONNECTED mode and an AMF that may be configured to be without per-UE association. FIG. 4 depicts an example process flow 400 that illustrates aspects of some such example implementations. As shown in block 402 of FIG. 4, process flow 400 arises in a situation involving an AMF without per-UE association. In some such situations, an AMF may assume that it will not continue to be the serving AMF for a relevant UE after most or all of a CM-IDLE to CM-CONNECTED transition is performed with respect to the UE. In some such situations, and as illustrated at block 404 of FIG. 4, the AMF may assign to the UE a temporary ID that includes the AMF Group ID and information that will allow a new AMF to locate the relevant UE context information. In some such example implementations, a DS ID may also be included in the temporary ID. It will be appreciated that in some such example implementations, the AMF instance ID may be indicated as not valid for AMF selection and/or is not provided. As such, and as shown in block 406, the RAN and/or other access network may use the AMF Group ID in connection with selecting the correct pool of AMFs for use when the current AMF ceases to be the serving AMF for the relevant transitioning UE.

As shown at block 408, example implementations of process 400 contemplate that for subsequent N1/N2 transactions, the RAN and/or other relevant access network may select any AMF from the pool. In some example implementations of block 408, such as those that may involve subsequent N1/N2 transactions (such as those that may be involved when the UE transitions from a CM-IDLE to a CM-CONNECTED state), the (R)AN may detect that the AMF instance ID is not included in the temporary ID and/or is included in the temporary ID with an indication that it is not valid for AMF selection. In such situations, the (R)AN may then select any AMF from the pool of AMFs identified by the AMF Group ID. The newly selected AMF may then use the information within the temporary ID to retrieve UE context and process the transaction.

Some example implementations of process flow 400 and/or other implementations that arise in situations where the AMF is without per-UE association contemplate that, at a later time and for an UE in connected mode, the AMF may decide that it does wants to be and/or remain the serving AMF for this UE. In such situations, the AMF may reassign the temporary ID to include an AMF instance ID that allows the (R)AN to forward further UE requests to this AMF that wishes to remain as the serving AMF.

Example Scenario 3: AMF in Hybrid Mode

As noted herein, some example implementations of embodiments of the invention described, contemplated, and/or otherwise disclosed herein involve a UE that is transitioning from a CM-IDLE mode to a CM-CONNECTED mode and an AMF that may be configured to be in a hybrid mode. FIG. 5 depicts an example process flow 500 that illustrates aspects of some such example implementations. As shown in block 502 of FIG. 5, process flow 500 arises in a situation involving an AMF in hybrid mode. When in a hybrid mode, an AMF may decide based on local policies (such as depending on load conditions, operational reasons such as load redistribution, and/or other factors, for example) whether or not the AMF wants to continue to be the serving AMF for UEs that have transitioned to an IDLE mode and/or similar mode. In some example implementations, such a decision by the AMF may be performed on a "per transaction basis". Also, as shown in block 504, some example implementations of process flow 500 involve the assignment by an AMF of a temporary ID to a relevant UE. In some such example implementations, the temporary ID may include an AMF Group ID, an AMF Instance ID, and information that permits an AMF to locate the relevant UE context, which may include a DS ID.

Regardless of the considerations and/or other factors that impact an AMF's decision whether to remain as the serving node, some example implementations of process flow 500 include and operations depicted at block 506. As shown in block 506, in situations where the AMF decides that it does not want to remain as a serving network function (NF) for any UE, the AMF may send a "per AMF" signaling towards the RAN and/or other relevant access network over N2 indicating the AMF will become "non-sticky" in IDLE mode. This indication may be considered to be "global", at least in the sense that it is not associated with any specific UE, for example. As shown at block 508, the (R)AN and/or other access network may then store the association between the AMF instance and the "non sticky" IDLE mode operation of the AMF instance.

As shown in block 510, some example implementations of process flow 500 contemplate that, when a UE transitions from an IDLE mode to a CONNECTED mode, the (R)AN may evaluate the temporary ID to determine if the temporary ID includes an AMF instance ID which is the same as an AMF that signaled itself as "non-sticky". Upon a determination that the AMF instance ID is the same as one of the AMF that has signaled its willingness to be "non-sticky", then (R)AN may ignore the AMF instance ID within the temporary ID. In example implementations where the AMF instance ID is ignored, the (R)AN may use the AMF Group ID within the temporary ID provided by the UE to identify the correct AMF pool and to select an AMF from the correct AMF pool. Subsequently, the selected AMF may use the information within the temporary ID to retrieve the relevant UE context and process the transaction.

It will be appreciated that some example implementations disclosed herein allow for an AMF to determine whether it remains sticky or not. In some such example implementations, such as determination may be implemented as a specific option associated with the AMF. As a result, such example implementations allow for both stateless and stateful AMF instances to be deployed within a given operator's network.

In some example implementations, the AMF may later send a "per AMF" signaling towards the RAN and/or other relevant access network over N2 indicating the AMF removes the "non-sticky" in IDLE indication mode of operation of the AMF instance. This indication may be considered to be "global", at least in the sense that it is not associated with any specific UE.

Additional Considerations for AMF Selection in the (R)AN:

As discussed herein, particularly with reference to Example Scenarios 2 and 3 above and their corresponding FIGS. 4 and 5, some implementations of example embodiments of the invention described, contemplated, and/or otherwise disclosed herein involve aspects of selecting, within a (R)AN, of a particular AMF. In some such example implementations, for a subsequent MO/MT transaction, the (R)AN may be considered as having two options for AMF selection: (1) Support for AMF redirection, and (2) (R)AN and Core control plane (CP) NFs using a common repository and/or selection function. In situations involving support of AMF redirection, a (R)AN may select the AMF pool using an AMF Group ID. Subsequently, the (R)AN may select any AMF (which may, for example involve the use a load balancer). In some such example implementations, when the (R)AN and/or other access network selects an AMF, another AMF may already be serving the UE due to race conditions and/or other factors. In such a case, the selected AMF (which may be considered to be the wrong AMF, for example) may redirect the request to the correct AMF. In situations involving a (R)AN and/or core CP NFs using a common repository and/or selection function, a (R)AN may use the common repository and/or selection function with the core CP NFs (which may include, for example, a session management function or other function, and with may take into account consideration such as a load) for selecting the correct AMF and validating this selection (such as checking that no race condition has induced the selection of another AMF for the UE at the same time, for example). Additional details that may be pertinent to particular example implementations that involve AMF selection within a (R)AN are presented below.

Aspects of Support of AMF Redirection:

Many example implementations of the invention disclosed herein that involve support for AMF redirection in connection with AMF selection in a (R)AN contemplate making a determination that an AMF is the "wrong" AMF. In some such example implementations, in order for a selected AMF to know that another AMF is currently serving the UE, and therefore determine that it is the "right AMF" or "wrong AMF", the selected AMF may perform the following steps:

First, the selected AMF may query a repository (which may, for example, be determined based on a location provided within a temporary ID) to retrieve the relevant UE context for processing an N1/N2 transaction. Alternatively, the selected AMF may attempt to retrieve the relevant UE context from a location pointed to by a DS ID within the temporary ID used for an N1/N2 transaction.

Second, the repository (which may be a DSF, for example) that holds the UE context determines that another AMF is already the master of UE context information (and thus may be considered to be the serving AMF for the given UE). Consequently, the repository may then reject the request for context retrieval and respond with an indication of the correct AMF instance. In example implementations that arise in such a case, the AMF that was selected by the (R)AN and/or other access network may forward the request to the correct serving AMF. Otherwise, the repository may return the UE context information.

One of the challenges that arises in example implementations that involve AMF redirection at the (R)AN is that of determining how the response towards the (R)AN should be handled during redirection. In general, example implementations of embodiments of the invention described and/or otherwise disclosed herein contemplate the use of one of three alternatives. In each of the three alternatives discussed herein, the (R)AN and/or other access network may be required to correlate the response received from the serving AMF with the initial request and associate the UE with the serving AMF.

One of the potential alternatives involves communication that may be considered to be triangular communication. In some such situations, the "wrong" AMF may forward the N1/N2 transaction to the correct serving AMF, and the correct serving AMF may respond to (R)AN. In some situations, this will result in a different N2AP connection being used for both the request and the response. In order to support such communication, the request forwarded from the wrong AMF to the serving AMF may contain the N2AP reference received from the (R)AN and/or other access network. As a result, the serving AMF may then provide the N2AP reference in the response to the (R)AN and/or other access network. Consequently, the (R)AN and/or other access network may correlate the 2 N2AP "connections" and understand that the N2AP "connection" with the serving AMF can and/or should be considered as replacing the one with the wrong AMF. In some example implementations, this may also be used by the (R)AN to validate that the request received from the serving AMF is genuine.

Another of the potential alternatives involves redirection via the (R)AN. In some example implementations of such an alternative approach, the "wrong" AMF may respond to the (R)AN with the identity of the correct AMF. As such, the (R)AN and/or other access network may forward the N1/N2 transaction to the correct AMF. It will be appreciated that, in some example implementations of such an alternative, this will result in the transmission of two requests and responses for the same transaction.

A third of the potential alternatives may be considered to involve proxying at the AMF. In some example implementations of such an alternative, the "wrong" AMF may forward the N1/N2 transaction to the correct serving AMF. Subsequently, the serving AMF may proxy the response to the (R)AN via the wrong AMF. In will be appreciated that, in some example implementations, this will result in the same N2AP connection being used for the request and response. However, one or more subsequent N1/N2 transactions may require that at least one new N2AP connection be setup between the (R)AN and the serving AMF (such as to transfer further signaling within the same transaction and/or if the new AMF assigns an AMF instance ID and wants to be sticky, for example). In some such example implementations, the response sent to the (R)AN may need to contain an indication informing the (R)AN and/or other access network that that, for a given UE, it may need to immediately set up a new N2AP connection with the serving AMF to enable subsequent communication between the (R)AN and the serving AMF.

Aspects of Support for a (R)AN Using a Common Repository/Selection Function for AMF Selection:

As noted above, some example implementations of the invention described and/or otherwise disclosed herein contemplate a (R)AN and/or other access network using a common repository and/or selection function in connection with AMF selection. In some example implementations that adopt such an optional approach, a challenge arises in ensuring the synchronization of an AMF selection for MO and MT transactions. In some such situations, a (R)AN and one or more Core CP NFs (which may include an SMF, for example) that must select an AMF may use the common repository and/or selection function (which may include or more of an NRF, NNSF and/or DSF, for example) in order to select an AMF for a given UE. Upon selection of the AMF for a given UE by either the relevant (R)AN and/or the core CP NFs (which may include, for example, an SMF), the selected AMF instance ID may be stored in the repository. In will be appreciated that, in order for the (R)AN and core CP NFs to use the same repository function, the same repository function information may need to be configured in the (R)AN and Core CP NFs.

Another challenge that may arise in such situations is that of avoiding race conditions for accessing the common repository and/or selection function. In at least some example implementations, avoiding such race conditions may be achieved as follows:

First, a requester may discover the NFs and selects a certain NF based at least on part on its internal logic and/or other rules. The requester may then select a new NF (which may be an AMF, for example). Upon doing so, the requester may then interact with the common repository and/or selection function (which may be one or more of an NRF, NNSF and/or DSF, for example) to write the newly selected NF (which, as noted earlier, may be an AMF, for example) as a serving NF for a given UE. In situations where the common repository and/or selection function already has a serving NF for a given UE, the common repository and/or selection function may reject the write request and return the serving NF (which, in some situations may be the serving AMF, for example). If not, the common repository and/or selection function may update the record and may make the newly selected AMF the serving AMF for a given UE. In such a situation, the requester may be notified accordingly.

Considerations Associated With Other AMF Interfaces:

Many example implementations of embodiments of the invention described and/or otherwise disclosed herein arise in network environments that may involve multiple network functions and/or network elements. In order to ensure that other NFs (such as one or more SMF, PCF, UDM, AUSF, and the like, for example) are informed that a particular AMF is no longer serving a given UE (or any UE, for example), the AMF may send a "hybrid release" indication (which may be achieved as per UE signaling, for example) or a "hybrid release" indication (which may be non-UE specific, and achieves as per AMF signaling, for example) towards other NFs. In some example implementations, based at least in part on the receipt of a hybrid release indication, other NFs may remove the AMF and/or a related association from the UE specific context. Consequently, each such NF should know and/or be considered as informed that it may need to select an AMF in the pool for subsequent UE-specific transactions for which there is no serving AMF associated to the given UE. In the context of AMF selection, one of the above approaches and/or considerations presented with respect to AMF selection in the (R)AN may be adopted.

Considerations Associated with Network Slicing:

Some proposals related to 5G networks contemplate the use and/or other implementation of network slicing and/or network slicing-like structures and protocols. It will be appreciated that, in some example implementations of the invention described and/or otherwise disclosed herein, the requirement for AMF stickiness removal may be considered agnostic to the UE. As such, the UE should be able to obtain the same set of services regardless of whether the AMF is sticky or not. Consequently, the same service level criteria (such as an NSSAI value, for example) may be used for selecting an AMF. In some example implementations, doing so implies that the old serving AMF (that is, the AMF serving one or more previous UE-specific transactions) and the new serving AMF (that is, the AMF serving a new UE-specific transaction) may support similar capabilities and services.

Regardless of the precise environment in which example implementations of the invention described and/or otherwise disclosed herein arise, many such example implementations may exhibit a level of adherence to the following guidelines: (1) for the duration of individual NAS and/or NG2 procedures, the UE shall be served by the same AMF Instance; (2) the use by one UE of a different instances of an AMF may be allowed in the case of time-separated NAS or NG2 procedures; (3) in at least some situations, it should be possible to release one or more "per UE association" from the AMF without additional signaling (such as for temporary ID reassignment, for example) towards an inactive UE; and (4) a certain UE may have only one serving AMF at any given point.

In view of the guidelines, many example implementations are able to provide for and/or facilitate solutions that exhibit the following characteristics and/or otherwise exhibit the following principles:

(1) In at least some example implementations, a temporary ID should include information sufficient to identify the UE, locate the registered UE context, identify the pool of AMFs and/or optionally identify a specific AMF instance.

(2) In situations where a relevant AMF wants to become "non-sticky", that AMF may send a hybrid release to the (R)AN to indicate that N2 is released but N3 is still active for the given UE.

(3) Situations involving a specified approach to N2 stickiness removal in 3GPP should allow an AMF to determine whether it remains sticky or not, as an implementation-specific option. As such, it should allow one or more stateless and/or stateful AMFs to be deployed in an operator's network.

(4)(a) In many example implementations, an AMF may send a "hybrid release" indication to other CP NFs to indicate that the AMF is not serving a given UE anymore. In such situations, if the AMF will not serve any UE anymore, the AMF may send a "per AMF" hybrid release indication to other CP NFs with which the AMF interfaces.

(4)(b) In some situations, a central repository may be needed for validation of a selected AMF by a (R)AN and/or other Core CP NFs.

(4)(c) In some situations, support for an AMF redirection solution is necessary to resolve race conditions.

(5) In some situations, an AMF stickiness removal requirement is agnostic to the UE. This implies that the old serving AMF (that is, the AMF serving one or more previous UE specific transactions) and the new serving AMF (that is, the AMF serving a new UE specific transaction) support similar capabilities and services.

Regardless of the situation in which a given example implementation arises, it will be appreciated that many of the example implementations and/or other approaches to addressing stickiness and its related challenges provide solutions that enable stateless AMFs and/or otherwise enable any AMF to process a subsequent N1/N2 transaction and generally help improve the resiliency of an AMF, which may improve AMF redundancy from 1:1 to 1:n.

As described above, FIGS. 3, 4, and 5 illustrate flowcharts of an apparatus 200, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 204 of an apparatus employing an embodiment of the present invention and executed by the processor 202 of the apparatus. As will be appreciated, any such computer program instructions may be loaded onto a computer or other programmable apparatus (such as hardware, for example) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
   receiving, by an access network, a temporary identifier, wherein the temporary identifier was assigned by a first access and mobility management function to a user equipment device, and wherein the temporary identifier includes an identification of a plurality of access and mobility management functions;
   detecting a transition of the user equipment device from an idle mode to a connected mode;
   based at least in part on the temporary identifier and detecting the transition, selecting, by the access network, an access and mobility management function from amongst the plurality of access and mobility management functions; and
   assigning the selected access and mobility management function to the user equipment device.

2. The method of claim 1, wherein the temporary identifier comprises an identification of the user equipment device.

3. The method of claim 2, wherein the temporary identifier comprises an identification of a second access and mobility management function.

4. The method of claim 3, further comprising receiving, by the access network, an indication of an unavailability of the second access and mobility management function.

5. The method of claim 4, further comprising storing, by the access network, an indication of the unavailability of the second access and mobility management function.

6. The method of claim 5, wherein selecting, by the access network, the access and mobility management function from amongst the plurality of access and mobility management functions comprises:
   detecting the indication of the unavailability of the second access and mobility management function; and
   selecting a third access and mobility management function from amongst the plurality of access and mobility management functions.

7. The method of claim 4, wherein the indication of the unavailability of the second access and mobility management function comprises an indication of a release of a control plane interface between the second access and mobility management function and the access network and an indication of a non-release of a user plane interface associated with the user equipment device.

8. An apparatus, comprising:
   at least one processor; and
   at least one memory storing computer program code, the at least one memory and the computer program code configured to, with the processor, cause the apparatus to at least
   receive a temporary identifier, wherein the temporary identifier was assigned by a first access and mobility management function to a user equipment device, and wherein the temporary identifier includes an identification of a plurality of access and mobility management functions;
   detect a transition of the user equipment device from an idle mode to a connected mode;
   based at least in part on the temporary identifier and in response to detecting the transition, select an access and mobility management function from amongst the plurality of access and mobility management functions; and
   assign the selected access and mobility management function to the user equipment device.

9. The apparatus of claim 8, wherein the temporary identifier comprises an identification of the user equipment device, and an identification of a second access and mobility management function.

10. The apparatus of claim 9, wherein at least one memory and the computer program code are further configured to, with the at least one processor, cause the apparatus to at least:
   receive an indication of an unavailability of a second access and mobility management function; and store an indication of the unavailability of the second access and mobility management function.

11. The apparatus of claim 10, wherein to select the access and mobility management function from amongst the plurality of access and mobility management functions, the at least one memory and the computer program code are further configured to, with the at least one processor, cause the apparatus to at least:
- detect the indication of the unavailability of the second access and mobility management function; and
- select a third access and mobility management function from amongst the plurality of access and mobility management functions.

12. The apparatus of claim 10, wherein the indication of the unavailability of the second access and mobility management function comprises an indication of a release of a control plane interface between the second access and mobility management function and an access network and an indication of a non-release of a user plane interface associated with the user equipment device.

13. A computer program product embodied on a non-transitory computer-readable storage medium having computer-executable program code instruction stored therein, the computer-executable program code instructions comprising program code instructions configured to:
- receive, by an access network, a temporary identifier, wherein the temporary identifier was assigned by a first access and mobility management function to a user equipment device, and wherein the temporary identifier includes an identification of a plurality of access and mobility management functions;
- detect a transition of the user equipment device from an idle mode to a connected mode;
- based at least in part on the temporary identifier and in response to detecting the transition, select, by the access network, an access and mobility management function from amongst the plurality of access and mobility management functions; and
- assign the selected access and mobility management function to the user equipment device.

14. The computer program product of claim 13, wherein the temporary identifier comprises an identification of the user equipment device, and an identification of a second access and mobility management function.

15. The computer program product of claim 14, further comprising program code instructions configured to:
- receive, by the access network, an indication of an unavailability of the second access and mobility management function; and
- store, by the access network, an indication of the unavailability of the second access and mobility management function.

16. The computer program product of claim 15 wherein to select the access and mobility management function from amongst the plurality of access and mobility management functions, the program code instructions are further configured to:
- detect the indication of the unavailability of the second access and mobility management function; and
- select a third access and mobility management function from amongst the plurality of access and mobility management functions.

17. The computer program product of claim 15, wherein the indication of the unavailability of the second access and mobility management function comprises an indication of a release of a control plane interface between the second access and mobility management function and the access network and an indication of a non-release of a user plane interface associated with the user equipment device.

18. A system comprising an apparatus and a user equipment, the apparatus comprising at least one processor and at least one memory storing computer program code, the at least one memory and the computer program code configured to, with the processor, cause the apparatus to at least:
- receive a temporary identifier, wherein the temporary identifier was assigned by a first access and mobility management function to the user equipment device, and wherein the temporary identifier includes an identification of a plurality of access and mobility management functions;
- detect a transition of the user equipment device from an idle mode to a connected mode;
- receive an indication of an unavailability of a second access and mobility management function from the plurality of access and mobility management functions;
- based at least in part on the temporary identifier and the indication and in response to detecting the transition, select an access and mobility management function from amongst the plurality of access and mobility management functions; and
- assign the selected access and mobility management function to the user equipment device.

19. A user equipment device comprising at least one processor and at least one memory storing computer program code, the at least one memory and the computer program code configured to, with the processor, cause the apparatus to at least:
- receive a temporary identifier, wherein the temporary identifier was assigned by a first access and mobility management function to the user equipment device, and wherein the temporary identifier includes an identification of a plurality of access and mobility management functions;
- perform a transition from an idle mode to a connected mode;
- send the temporary identifier to enable a selection, based at least in part on the temporary identifier, of an access and mobility management function from amongst the plurality of access and mobility management functions; and
- receive an assignment of the selected access and mobility management function.

* * * * *